(12) United States Patent
Rozen et al.

(10) Patent No.: US 8,255,723 B2
(45) Date of Patent: Aug. 28, 2012

(54) DEVICE HAVING MULTIPLE INSTRUCTION EXECUTION MODULES AND A MANAGEMENT METHOD

(75) Inventors: Anton Rozen, Gedera (IL); Michael Priel, Hertzelia (IL); Leonid Smolyansky, Zichron Yakov (IL)

(73) Assignee: Freescale Semiconductor, Inc., Austin, TX (US)

( * ) Notice: Subject to any disclaimer, the term of this patent is extended or adjusted under 35 U.S.C. 154(b) by 424 days.

(21) Appl. No.: 12/509,285

(22) Filed: Jul. 24, 2009

(65) Prior Publication Data

US 2011/0022869 A1 Jan. 27, 2011

(51) Int. Cl.
*G06F 1/26* (2006.01)
(52) U.S. Cl. ........... 713/323; 713/321; 713/324; 712/43
(58) Field of Classification Search ............... 713/321, 713/323, 324; 712/43
See application file for complete search history.

(56) References Cited

U.S. PATENT DOCUMENTS

| | | | |
|---|---|---|---|
| 6,240,521 B1 * | 5/2001 | Barber et al. | 713/323 |
| 6,341,347 B1 | 1/2002 | Joy et al. | |
| 6,501,999 B1 | 12/2002 | Cai | |
| 6,631,474 B1 | 10/2003 | Cai et al. | |
| 6,711,447 B1 | 3/2004 | Saeed | |
| 7,152,170 B2 | 12/2006 | Park | |
| 7,219,245 B1 | 5/2007 | Raghuvanshi | |
| 7,222,030 B2 | 5/2007 | Banginwar et al. | |
| 7,239,980 B2 | 7/2007 | DeWitt, Jr. et al. | |
| 2003/0088800 A1 | 5/2003 | Cai | |
| 2008/0244608 A1 * | 10/2008 | Daito | 718/104 |
| 2008/0301474 A1 | 12/2008 | Bussa et al. | |

* cited by examiner

*Primary Examiner* — Thuan Du (57) ABSTRACT

A multiple instruction execution modules device that comprises a first instruction execution module and a second instruction execution module and a context switch controller; wherein the first instruction execution module is logically identical to the second instruction execution module but substantially differs from the second instruction execution module by at least one power consumption characteristic; wherein the context switch controller controls a context switch between the first instruction execution module and the second instruction execution module; wherein an instruction execution module that its context has been transferred is shut down.

20 Claims, 8 Drawing Sheets

DEVICE HAVING MULTIPLE INSTRUCTION EXECUTION MODULES AND A MANAGEMENT METHOD

FIELD OF THE INVENTION

This application relates to a device having multiple instruction execution modules and to a method for managing such a device.

BACKGROUND OF THE INVENTION

Modern mobile devices (as well as battery powered devices) should be characterized by high performance but are expected to consume few power as possible.

Such devices include multiple semiconductor circuits. A power consumption of a semiconductor circuit includes leakage power consumption and switching power consumption. Leakage power consumption is attributed to leakage currents that flow through semiconductors components (such as transistors, diodes, and the like) of the semiconductor circuit while switching power consumption is attributed to switching activities of these semiconductor components.

Many power reduction techniques were developed during the last decades. Techniques such as differential voltage and frequency scaling (DVFS) and power gating are aimed to reduce the switching power consumption. DVFS involves altering the supply voltage level and clock signal frequency provided to a circuit. Power gating includes operating a semiconductor circuit at a maximal frequency and a maximal supply voltage level during activation periods and shutting down the circuit during deactivation periods. SRPG involves saving the state of some flip flops of the semiconductor circuit even when the circuit semiconductor is shut down.

Other techniques such as well-biasing are aimed to reduce leakage power consumption. Low leakage manufacturing processes also exist but yield in slower semiconductor circuits.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

A good trade off between power consumption and performance can be provided by switching between instruction execution modules that are logically identical to each other but substantially differ from each other by their power consumption. An instruction execution model that completes its task can be fully shut down in order to prevent leakage induced power consumption. The instruction execution modules can be manufactured by different manufacturing processes or by different flavors of the same process. The instruction execution modules can be included in the same semiconductor chip or at different semiconductors chips. Two instruction execution modules are logically identical to each other if they preform the same logical functions, have the same set of flip-flops and the like.

An instruction execution module includes at least one hardware component that can include multiple flip flops. It can be capable of receiving an instruction and perform at least one processing operation in response to the instruction. The instruction execution module can be a processor, a central processing unit, a digital signal processing, a direct memory access controller, a media player, a hardware filter, an arithmetic logic unit, a hardware accelerator, a decoder, an encoder, a ciphering circuit, a deciphering circuit, a core, or a portion of each of the mentioned above. It can include, for example, the "logic" portion of a processor while, yet for another example is can not include the entire internal memory of a processor.

The instruction execution module can be a part of a device such as a mobile phone, a smart phone, a media player, a game console, a lap top computer, a hand help computer, and the like.

Figure 1:
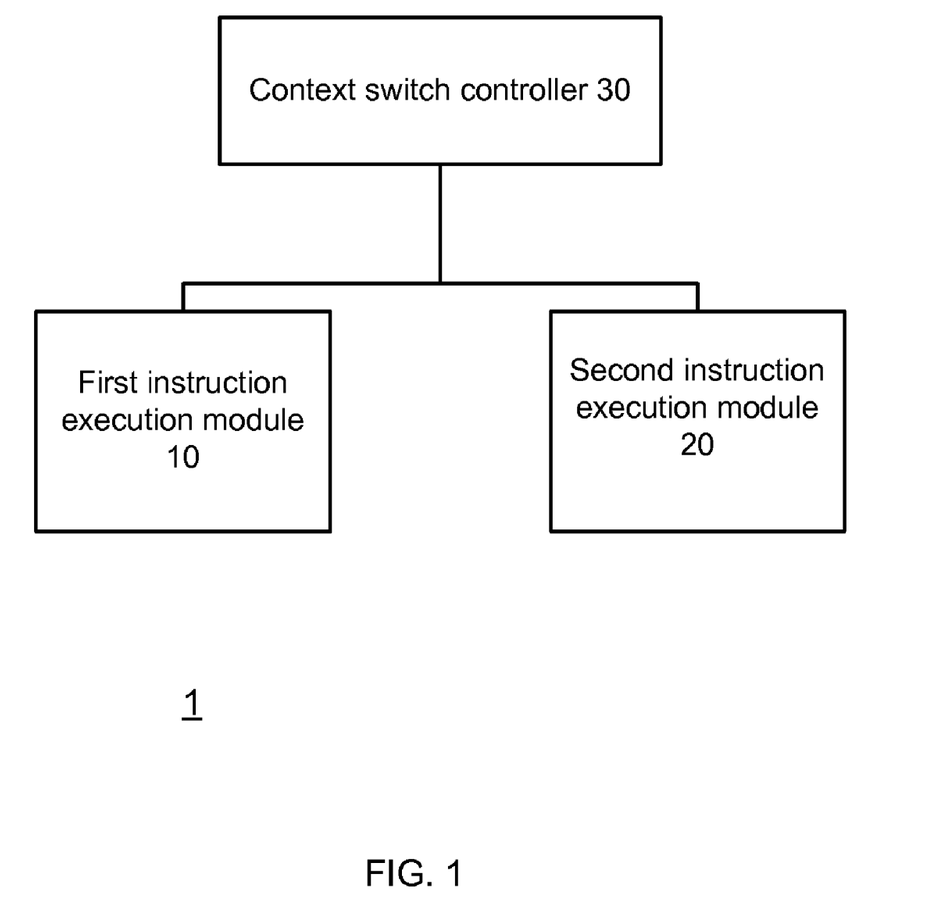
FIG. 1 schematically shows an example of an embodiment of a device that includes multiple instruction execution modules.

FIG. 1 schematically shows an example of an embodiment of device 1 that has multiple instruction execution modules.

Device 1 is also referred to as multiple instruction execution module device as it includes multiple instruction execution modules. Device 1 can include two or more instruction execution modules that are logically identical but differ from each other by their power consumption. For simplicity of explanation it is assumed that device 1 includes two instruction execution modules. Device 1 can include one or more context switch controllers. For simplicity of explanation it is assumed that device 1 includes a single context switch controller.

Device 1 includes first instruction execution module 10, second instruction execution module 20 and context switch controller 30. Each of first instruction execution module 10 and second instruction execution module 20 includes multiple flip flops and can include one or more software components or can execute one or more software components. Context switch controller 30 can be implemented by software, hardware or a combination thereof.

First instruction execution module 10 is logically identical to second instruction execution module 20 but substantially differs from the second instruction execution module by at least one power consumption characteristic. The power consumption characteristic can be leakage power consumption, dynamic power consumption or a combination thereof. The difference between values of power consumption parameters of first and second instruction execution modules 10 and 20 can range between 2% till 99%, but this is not necessarily so.

Different instruction execution modules can be synthesized for different performance parameters and additionally or alternatively, for different power consumption parameters. For example, one instruction execution module can be manufactured by process that provides a 1.2 Ghz clock frequency and 500 mW leakage instruction execution module while another instruction execution module can be manufactured by a process that provides a 0.5 Ghz clock frequency and 5 mW leakage instruction execution module.

The two instruction execution modules can be placed in proximity to each other, they can be implemented on the same chip, can be implemented as two separate components, and the like.

First instruction execution module 10 is logically identical to second instruction execution module 20 in the sense that both instruction execution modules are designed to perform the same operations. The set of flip-flops of the first instruction execution module 10 differs from the set of flip flops of second instruction execution module 20 by its power consumption. Each flip flop of first instruction execution module 10 can have a corresponding flip flop of second instruction execution module.

Combinational logic connected between a pair of flip flops of the first instruction execution module 10 can differ from combinational logic connected between a pair of corresponding flip flops of the second instruction execution module 20 but both combinational logics perform the same function. For example one combinational logic can include a NAND gate while the other can include an AND gate and an inverter.

Context switch controller 30 controls a context switch between the first instruction execution module 10 and the second instruction execution module 20 each of these modules can include hardware components, software components or a combination thereof.

Power reduction can be achieved by powering down an instruction execution module that its context has been transferred and by using the lower power consuming instruction execution module when possible.

Assuming that first instruction execution module 10 is characterized by higher performance and higher power consumption in relation to second instruction execution module 20 then first instruction execution module 10 can be utilized for more performance demanding tasks while second instruction execution module 20 can be utilized for less demanding tasks—when power consumption is more important.

Context switch controller 30 can determine when to perform a context switch but can receive a request to perform a context switch from another circuit such as the first and second instruction execution modules. An instruction set executed by either one of the instruction execution modules can include an instruction to perform the context switch. Context switch controller 30 can apply well known task switch or multi-threading techniques while taking into account at least one power consumption or performance parameter.

Context switch controller 30 can be configured to determine when to perform a context switch in response to at least one power reduction and performance parameter. These parameters can include, for example at least one of the following parameters or a combination thereof: power consumption gained from shutting down a currently active instruction execution module, power consumption required for performing the context switch, performance penalty resulting from the context switch, performance gains from the context switch, power consumption target, performance target and the like.

The context switch can include transferring the content (state) of flip flops of first instruction execution module 10 to corresponding flip flops of second instruction execution module 20 using one or more paths. This can be implemented by at least one of the following manners or a combination thereof: (i) utilizing scan chains that connect between flip flops of the first instruction execution modules and scan chains that connect between flip flops of the second instruction execution modules; (ii) utilizing dedicates buses that connect between flip flops of the first instruction execution modules and dedicated busses that connect between flip flops of the second instruction execution modules; (iii) utilizing a combination of scan chains and dedicated buses; (iv) utilizing non-dedicated buses—for example by re-using non-dedicated buses.

Figure 2:
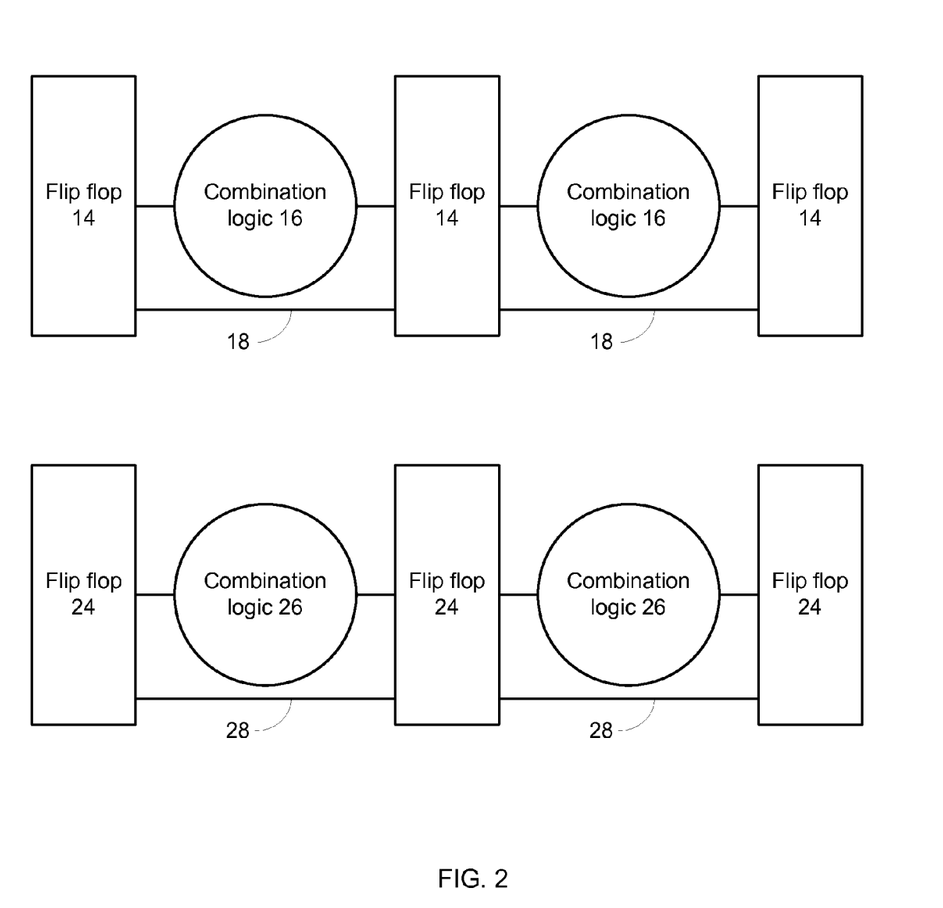
FIG. 2 schematically shows an example of an embodiment of a first group of flip flops of a first instruction execution module, combination logics, scan paths, and a second group of flip flops of a second instruction execution module.

FIG. 2 schematically shows an example of an embodiment of a first group of flip flops 14 of first instruction execution module 10, combination logics 16 connected between flip flops of the first group, scan paths 18 that connect flip flops of the first group to form scan chains, second group of flip flops 24 of second instruction execution module 20, combination logics 26 connected between flip flops of the second group and scan paths 28 that connect flip flops of the second group to form scan chains. A context transfer from first to second instruction execution modules include transferring the state of flip flops 14 via scan chains formed by scan paths 18 and 28 and flip flops that are connected to these paths. First group and second group of flip flops can include SRPG flip flops.

Each of first and second instruction execution modules can have state retention power gating (SRPG) flip flops that store their state in latches even when the instruction execution module enters a low power mode during which the SPRG are powered while other components are powered down. The content of these SRPG flip flops can be transferred to corresponding SRPG flip flops during the context switch. After the context switch is completed the instruction execution module can be powered down. It is noted that the context switch is not necessarily preceded by entering a low power mode. Each of first and second instruction execution modules can included "standard-cell flip flops (not SRPG flip flips) and their content can be moved to corresponding "standard-cell" flip flops First and second instruction execution modules 10 and 20 can share one or more shared memory instances. The context of these one or more shared memory instances is not transferred during the context transfer although this is not necessarily so.

First and second instruction execution modules 10 and 20 can execute software that differs from the software (if such exists) that controls the context switch. The term software can also include middleware, firmware, microcode, an operating system, a hypervisor, an application and the like. The context switch can be transparent to the executed software in the sense that the software is not involved in the context switch and is not substantially affected (there can be a short delay due to the context switch and the switching between instruction execution modules can affect the speed of execution) by the context switch.

Figure 3:
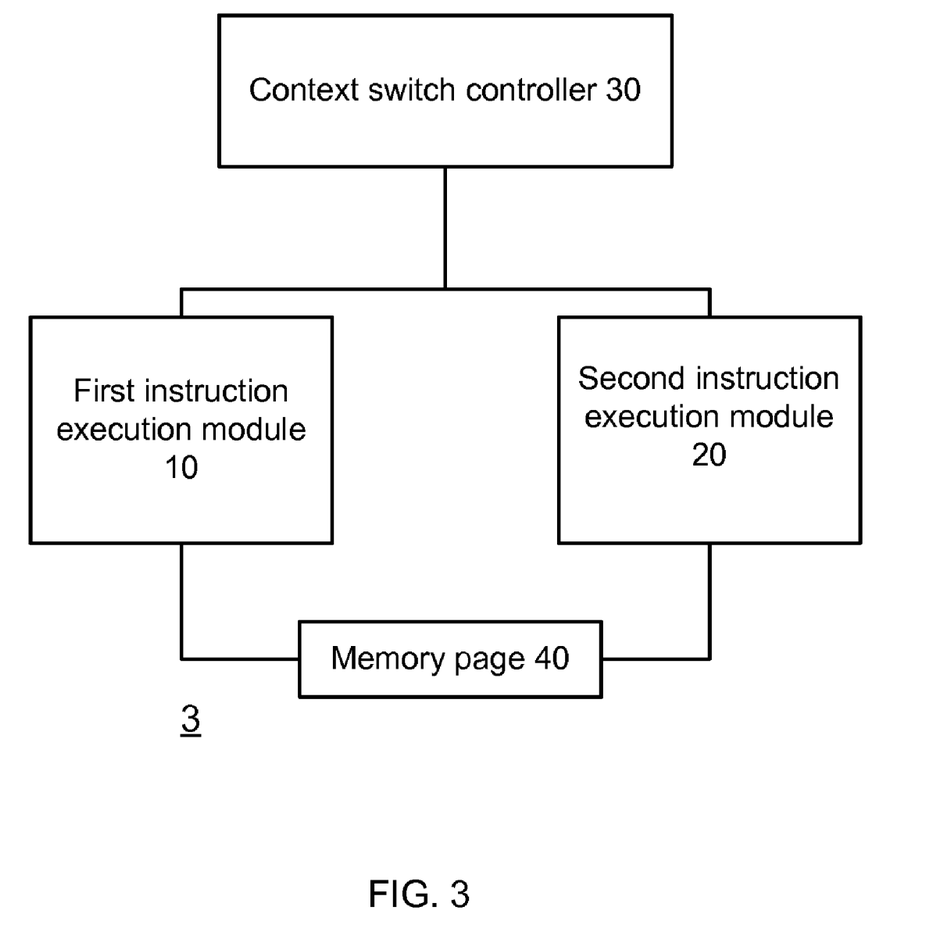
FIG. 3 schematically shows an example of an embodiment of a device that has multiple instruction execution modules.

FIG. 3 schematically shows an example of an embodiment of device 3 that has multiple instruction execution modules.

Device 3 includes first instruction execution module 10, second instruction execution module 20 and context switch controller 30. First and second instruction execution instructions can have at least one shared memory instance such as shared memory page 40. A context switch from one instruction execution module to another can include not transferring the content of shared memory page 40.

Figure 4:
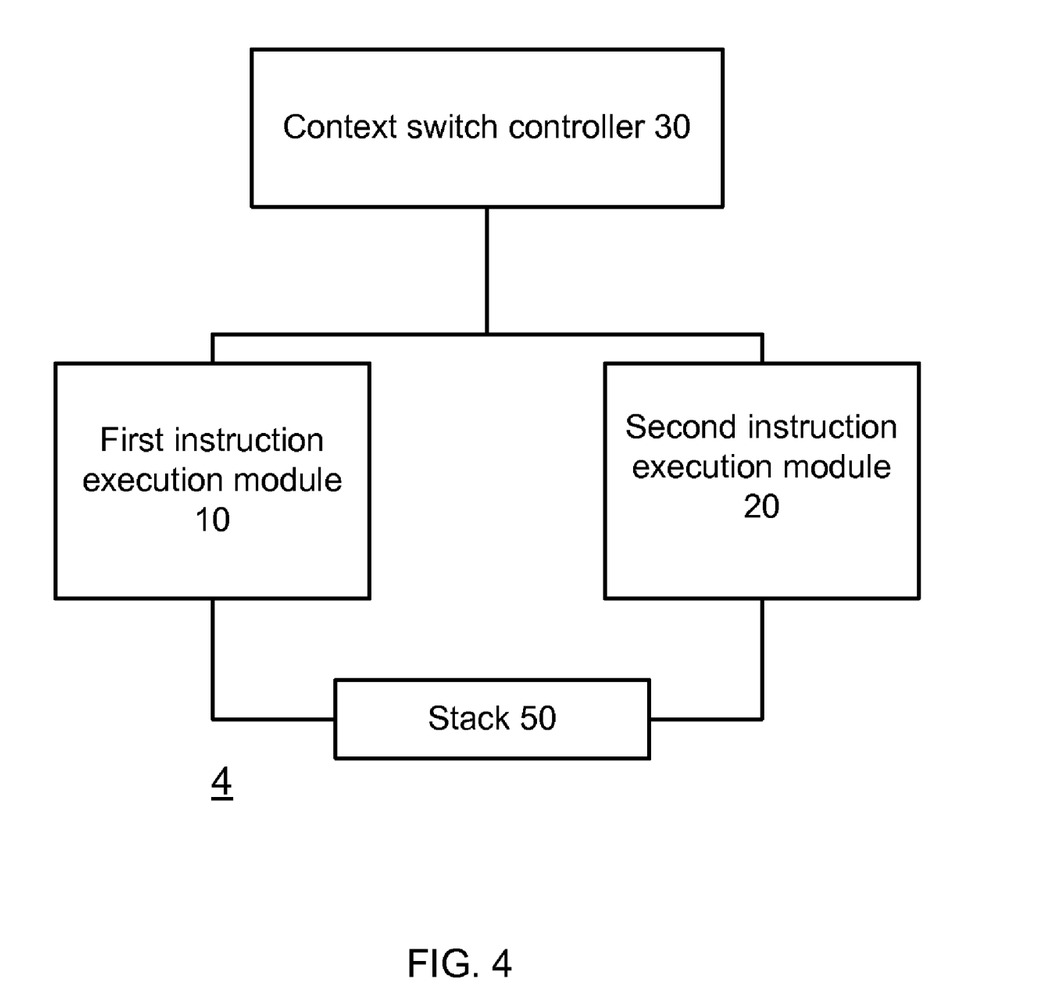
FIG. 4 schematically shows an example of an embodiment of a device that has multiple instruction execution modules.

FIG. 4 schematically shows an example of an embodiment of device 4 that has multiple instruction execution modules.

Device 4 includes first instruction execution module 10, second instruction execution module 20 and context switch controller 30. First and second instruction execution instructions 10 and 20 can be connected to stack 50 (or include a shared stack). A context switch from one instruction execution module to another can include not transferring the content of stack 50.

Figure 5:
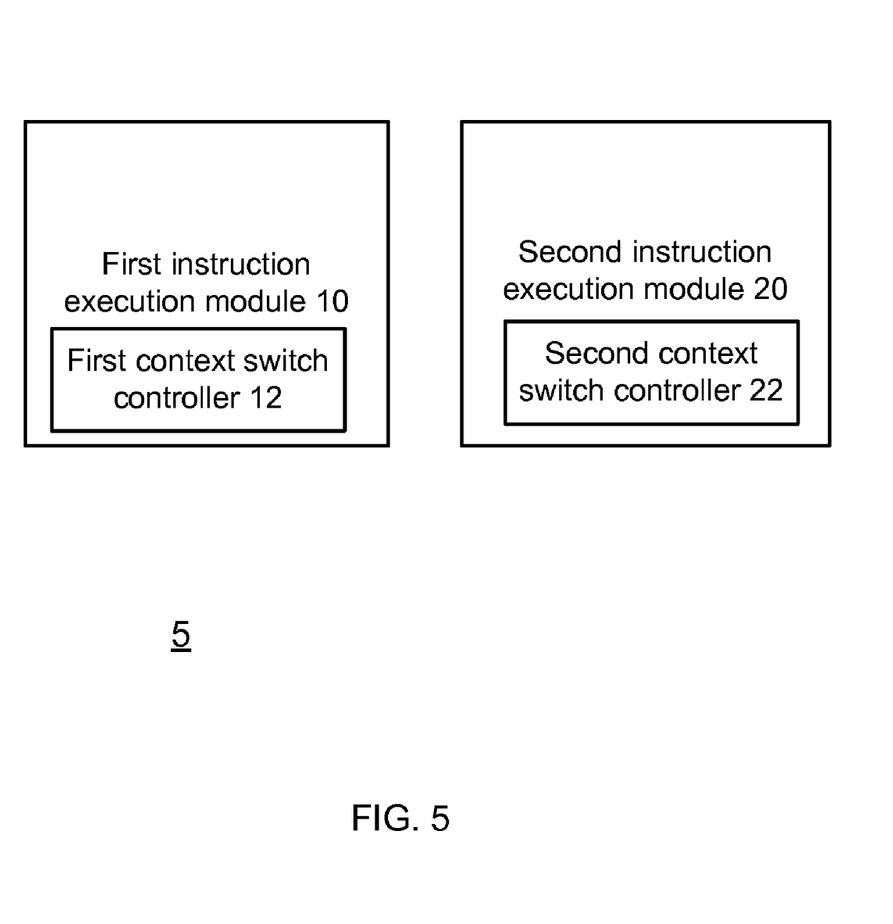
FIG. 5 schematically shows an example of an embodiment of a device that has multiple instruction execution modules.

FIG. 5 schematically shows an example of an embodiment of device 5 that has multiple instruction execution modules. Device 5 includes first context switch controller 12 and second context switch controller 22. First instruction execution module 10 includes first context switch controller 12 and second instruction execution module 20 includes second context switch controller 22. First context switch controller 12 can control a context switch from first instruction execution module 10 to second instruction execution module 20. Second context switch controller 22 can control a context switch from second instruction execution module 20 to first instruction execution module 10.

Figure 6:
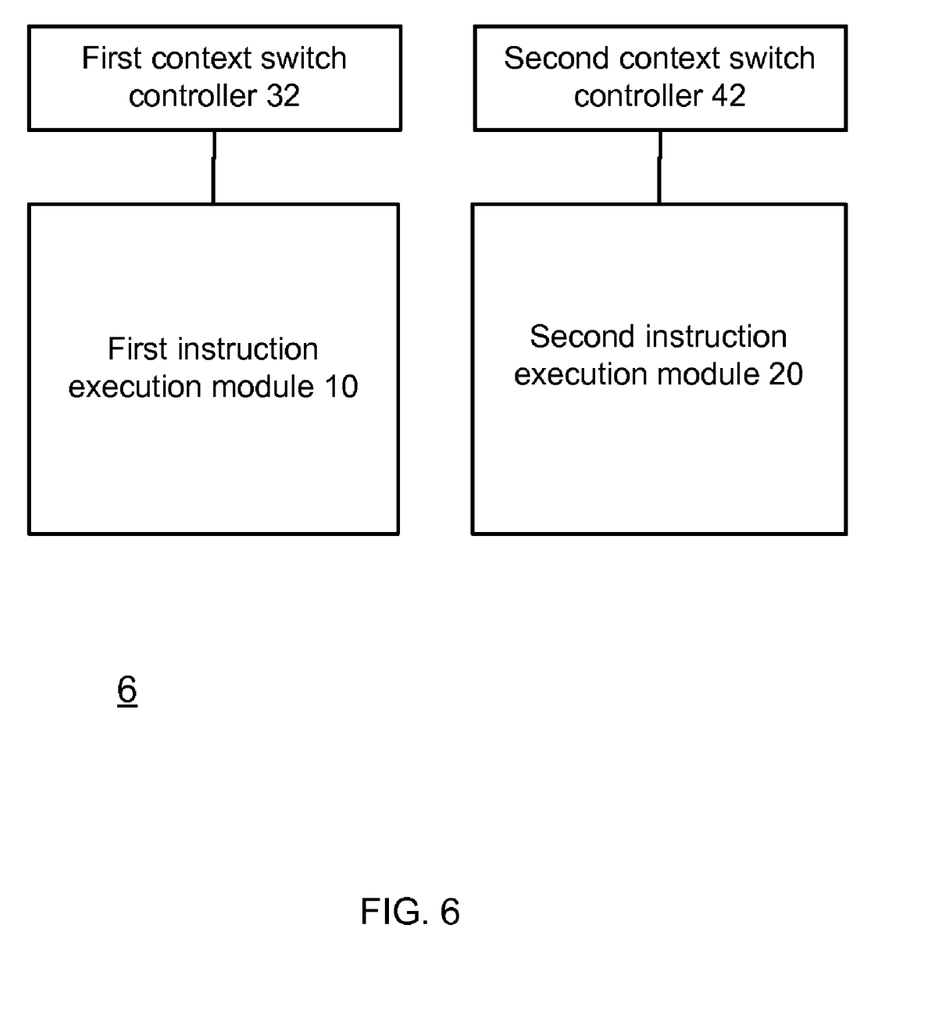
FIG. 6 schematically shows an example of an embodiment of a device that has multiple instruction execution modules.

FIG. 6 schematically shows an example of an embodiment of device 6 that has multiple instruction execution modules. Device 6 includes first context switch controller 32 and second context switch controller 42. First instruction execution module does not include first context switch controller 32 and second instruction execution module 20 does not include second context switch controller 42.

It is noted that one context switch controller can be included in an instruction execution module while another context switch controller can be outside an instruction execution module. One context switch controller can be implemented in hardware while another can be implemented in software.

Figure 7:
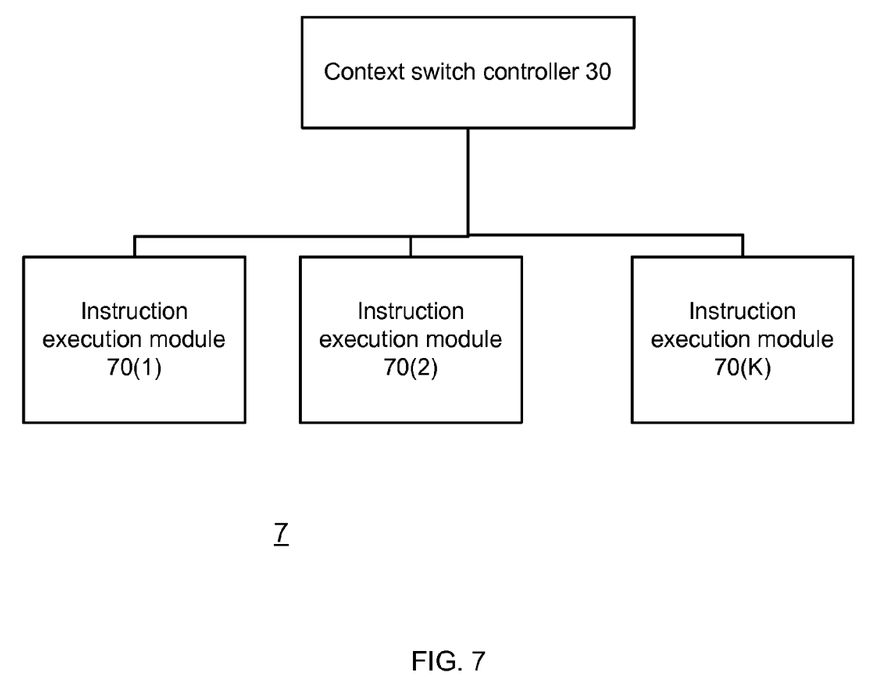
FIG. 7 schematically shows an example of an embodiment of a device that has multiple instruction execution modules.

FIG. 7 schematically shows an example of an embodiment of device 7 that has multiple instruction execution modules.

Device 7 includes multiple (K) instruction execution modules 70(1)-70(K) and context switch controller 30. K is an integer that is bigger than two (K>2). Device 7 can include additional context switch controllers that are not shown.

Instruction execution modules 70(1)-70(K) are logically identical to each other but differ from each other by at least one power consumption parameter. Context switches between these instruction execution modules can be executed in response to power reduction and performance parameters.

Device 7 can include multiple groups of instruction execution modules. The instruction execution modules of different groups can differ from each other. Instruction execution modules of the same group are logically identical to each other but differ from each other by at least one power consumption parameter.

Figure 8:
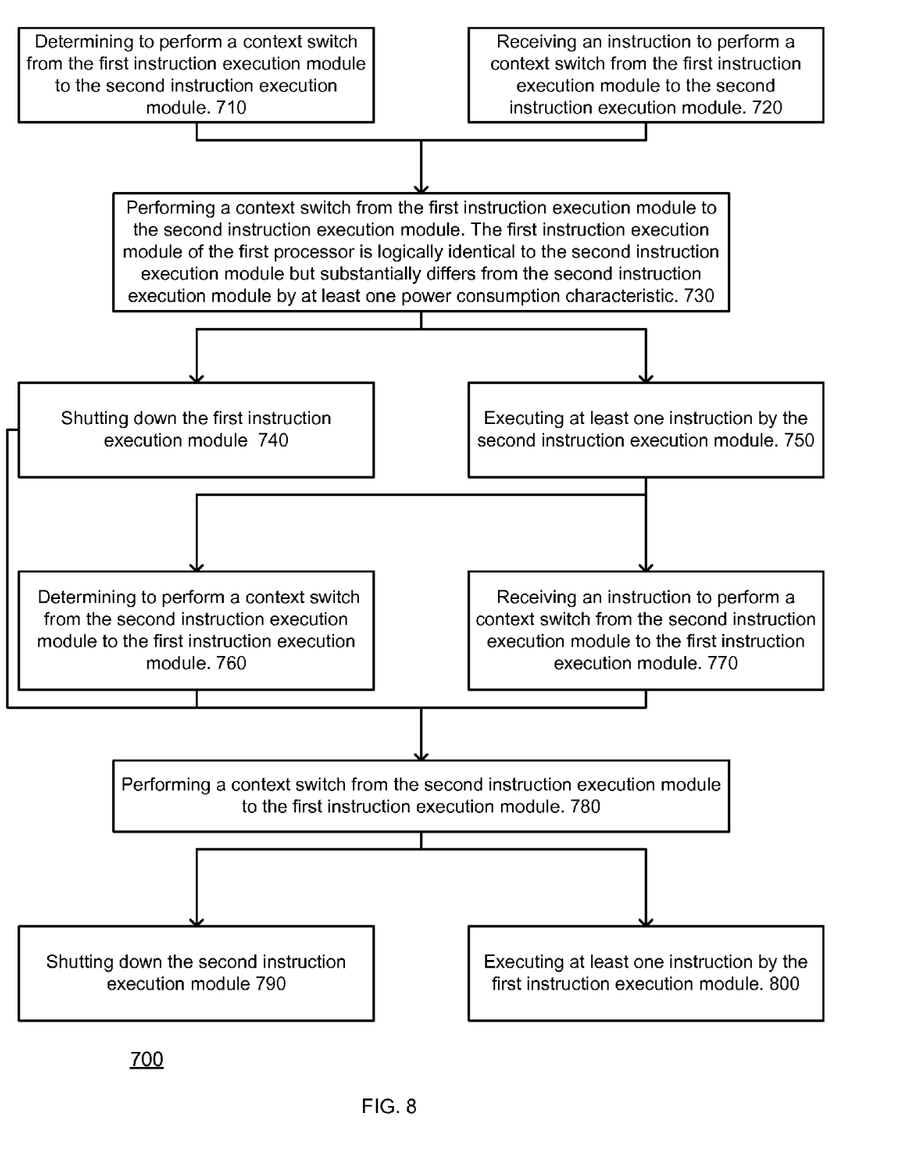
FIG. 8 schematically shows an example of an embodiment of a method for managing a device that includes multiple instruction execution modules.

FIG. 8 schematically shows an example of an embodiment of method 700 for managing a device that includes multiple instruction execution modules.

Method 700 starts by either one of stage 710 and 720.

Stage 710 includes determining to perform a context switch from the first instruction execution module to the second instruction execution module.

Stage 720 includes receiving an instruction to perform a context switch from the first instruction execution module to the second instruction execution module.

Stages 710 and 720 are followed by stage 730 of performing a context switch from the first instruction execution module to the second instruction execution module. The first instruction execution module of the first processor is logically identical to the second instruction execution module but substantially differs from the second instruction execution module by at least one power consumption characteristic.

Stage 730 is followed by stage 740 and 750.

Stage 740 includes shutting down the first instruction execution module. This can eliminate or substantially reduce the leakage related power consumption of the first instruction execution module.

Stage 750 includes executing at least one instruction by the second instruction execution module.

Stage 750 is followed by either one of stage 760 and 770.

Stage 760 includes determining to perform a context switch from the second instruction execution module to the first instruction execution module.

Stage 770 includes receiving an instruction to perform a context switch from the second instruction execution module to the first instruction execution module.

Stage 740, 760 and 770 are followed by stage 780.

Stage 780 includes performing a context switch from the second instruction execution module to the first instruction execution module.

Stage 780 is followed by stage 790 and 800.

Stage 790 includes shutting down the second instruction execution module.

Stage 800 includes executing at least one instruction by the first instruction execution module.

Stage 790 can be followed by stage 730.

Stage 800 can be followed by either one of stages 710 and 720.

Either one of stages 710 and 780 can be include determining when to perform a context switch in response to power reduction and performance parameters. These parameters can include, for example at least one of the following parameters or a combination thereof: power consumption gained from shutting down a currently active instruction execution module, power consumption required for performing the context switch, performance penalty resulting from the context switch, performance gains from the context switch, power consumption target, performance target and the like.

Either one of stages 730 and 780 can include transferring the content (state) of flip flops of a source instruction execution module to corresponding flip flops of the destination instruction execution module using one or more paths. During stage 730 the source instruction execution module is the first instruction execution module and the second instruction execution module is the destination instruction execution module. During stage 780 the source instruction execution module is the second instruction execution module and the first instruction execution module is the destination instruction execution module.

Either one of stages 730 and 780 can be implemented by at least one of the following manners or a combination thereof: (i) utilizing scan chains that connect between flip flops of the source instruction execution modules and scan chains that connect between flip flops of the destination instruction execution modules; (ii) utilizing dedicates buses that connect between flip flops of the source instruction execution modules and dedicated busses that connect between flip flops of the destination instruction execution modules; (iii) utilizing standard busses that can be multiple purpose buses or buses that are designed to be included in the device regardless of the context switching functionality.

Either one of stages 730 and 780 can include performing a context switch in a transparent manner to software executed by an instruction execution module. The context switch can be transparent to the executed software in the sense that the software is not involves in the context switch and is not substantially affected by the context switch.

Either one of stages 730 and 780 can include not transferring a content of a resource shared between the source and destination instruction execution modules. The shared source can be a stack, a memory instance, a memory bank, a memory page and the like.

Stage 730 can be controlled by a first context switch controller while stage 780 can be controlled by a second context switch controller. At least one of these contexts which controllers can be included in an instruction execution module, can be connected to an instruction execution module, can include a hardware component, can be implemented in software and the like.

Stage 730 can include controlling, by a first context switch controller, a context switch from the first instruction execution module to the second instruction execution module. Stage 780 can include controlling, by a second context switch controller, a context switch from the second instruction execution module to the first instruction execution module.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality.

In addition, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A multiple instruction execution module device that comprises:
   a first instruction execution module;
   a second instruction execution module logically identical to the first instruction execution module but substantially different from the first instruction execution module by at least one power consumption characteristic; and
   a context switch controller to control a context switch between the first instruction execution module and the second instruction execution module;
   wherein one of the first and second instruction execution modules is shut down when a context of the one of the first and second instruction execution modules has been transferred to the other one of the first and second instruction execution modules.

2. The device according to claim 1 wherein flip flops of the first instruction execution module transfer their context to corresponding flip flops of the second instruction execution module by utilizing scan chains.

3. The device according to claim 1 wherein flip flops of the first instruction execution module transfer their context to corresponding flip flops of the second instruction execution module by utilizing dedicated buses.

4. The device according to claim 1 wherein state retention power gating (SRPG) flip flops of the first instruction execution module transfer their context to corresponding SRPG flip flops of the second instruction execution module.

5. The device according to claim 1 wherein state retention power gating (SRPG) flip flops of the first instruction execution module transfer their context to corresponding SRPG flip flops of the second instruction execution module by utilizing scan chains.

6. The device according to claim 1 wherein the first and second instruction execution modules share a shared memory instance; wherein a context of the shared memory instance is not transferred during the context transfer.

7. The device according to claim 1 wherein each of the first and second instruction execution modules executes an operating system; wherein the context transfer is executed in a transparent manner to the operating system.

8. The device according to claim 1 wherein each of the first and second instruction execution modules executes a software application; wherein the context transfer is executed in a transparent manner to the software application.

9. The device according to claim 1 wherein the context switch controller is implemented in software.

10. The device according to claim 1 wherein the first and second instruction execution modules substantially differ from each other by their power consumption.

11. The device according to claim 1 wherein the context switch controller is configured to perform the context switch based on a request to transfer the context of the one of the first and second instruction execution modules to the other one of the first and second instruction execution modules.

12. The device according to claim 1 wherein the context switch controller is configured to determine when to perform the context switch in response to power reduction and performance parameters.

13. The device according to claim 1 wherein the context switch controller controls a copying of context to a stack.

14. The device according to claim 1 comprising a first and second context switch controllers; wherein the first context switch controller controls a first context switch from the first instruction execution module to the second instruction execution module and the second context switch controller controls a second context switch from the second instruction execution module to the first instruction execution module.

15. The device according to claim 14 wherein the first instruction execution module comprises the first context switch controller and the second instruction execution module comprises the second context switch controller.

16. A method for managing multiple instruction execution modules, the method comprises:

performing a first context switch from a first instruction execution module to a second instruction execution module; wherein the first context switch is performed directly between the first instruction execution module and the second instruction execution module, wherein the first instruction execution module is logically identical to the second instruction execution module but substantially differs from the second instruction execution module by at least one power consumption characteristic;

shutting down the first instruction execution module when a context of the first instruction execution module is received at the second instruction execution module;

performing a second context switch from the second instruction execution module to the first instruction execution module; and shutting down the second instruction execution module.

17. The method according to claim 16 comprising performing the first context switch from the first instruction execution module to the second instruction execution module by transferring a content of flip flops of the first instruction execution module to corresponding flip flops of the second instruction execution module by utilizing scan chains.

18. The method according to claim 16 comprising performing the first context switch from the first instruction execution module to the second instruction execution module by transferring a content of state retention power gating (SRPG) flip flops of the first instruction execution module to corresponding SRPG flip flops of the second instruction execution module.

19. The method according to claim 16 comprising performing the first and second context switches in a transparent manner to an operating system that is being executed by an instruction execution module out of the first and second instruction execution modules.

20. The method according to claim 16 performing the comprising performing a first context switch from the first instruction execution module to the second instruction execution module by a first context switch controller and performing a second context switch from the second instruction execution module to the first instruction execution module by a second context switch controller.

* * * * *